United States Patent
Karkanias (10) Patent No.: US 7,987,231 B2
(45) Date of Patent: Jul. 26, 2011

(54) FACILITATING INTERACTION BETWEEN WEB BROWSERS

(75) Inventor: George Basil Karkanias, Irvington, NJ (US)

(73) Assignee: Global Information Solutions, Inc. NY (US)

( * ) Notice: Subject to any disclaimer, the term of this patent is extended or adjusted under 35 U.S.C. 154(b) by 373 days.

(21) Appl. No.: 11/449,672

(22) Filed: Jun. 9, 2006

(65) Prior Publication Data

US 2007/0288563 A1    Dec. 13, 2007

(51) Int. Cl.
G06F 15/16 (2006.01)
(52) U.S. Cl. .......................... 709/204; 709/227
(58) Field of Classification Search .............. 709/204, 709/227
See application file for complete search history.

(56) References Cited

U.S. PATENT DOCUMENTS

| | | | | |
|---|---|---|---|---|
| 6,061,716 A * | 5/2000 | Moncreiff | ...................... | 709/204 |
| 6,076,100 A * | 6/2000 | Cottrille et al. | ................ | 709/203 |
| 6,442,590 B1 | 8/2002 | Inala et al. | | |
| 6,651,086 B1 * | 11/2003 | Manber et al. | ................ | 709/205 |
| 6,754,904 B1 | 6/2004 | Cooper et al. | | |
| 6,879,994 B1 | 4/2005 | Matsliach et al. | | |
| 6,996,605 B2 | 2/2006 | Low et al. | | |
| 7,526,435 B1 * | 4/2009 | Abe et al. | ........................ | 705/14 |
| 2002/0016788 A1 | 2/2002 | Burridge | | |
| 2002/0049752 A1 | 4/2002 | Bowman et al. | | |
| 2002/0078152 A1 * | 6/2002 | Boone | ........................... | 709/204 |
| 2002/0091832 A1 * | 7/2002 | Low et al. | ...................... | 709/227 |
| 2002/0174234 A1 * | 11/2002 | Trovato et al. | ................ | 709/227 |
| 2003/0014489 A1 | 1/2003 | Inala | | |
| 2003/0225836 A1 | 12/2003 | Lee et al. | | |
| 2004/0236832 A1 * | 11/2004 | Morris et al. | ................ | 709/204 |
| 2004/0254832 A1 * | 12/2004 | Harkin | ............................ | 705/14 |
| 2005/0108330 A1 * | 5/2005 | Sakaguchi et al. | ............ | 709/205 |
| 2005/0125416 A1 * | 6/2005 | Kirsch et al. | ..................... | 707/10 |
| 2006/0089978 A1 | 4/2006 | Lee et al. | | |
| 2006/0106623 A1 * | 5/2006 | Lebaschi | ........................... | 705/1 |
| 2006/0116926 A1 * | 6/2006 | Chen | .............................. | 705/14 |
| 2006/0248149 A1 * | 11/2006 | Kraft et al. | ..................... | 709/206 |
| 2007/0021957 A1 * | 1/2007 | Granger et al. | ............... | 704/200 |
| 2007/0136400 A1 * | 6/2007 | Ames et al. | .................... | 707/205 |
| 2007/0162294 A1 * | 7/2007 | Davidson et al. | ................. | 705/1 |
| 2007/0244968 A1 * | 10/2007 | Andreasson | .................. | 709/204 |
| 2008/0140774 A1 * | 6/2008 | Johnson | ........................ | 709/203 |
| 2009/0186703 A1 * | 7/2009 | Rouhi et al. | ..................... | 463/42 |
| 2010/0161400 A1 * | 6/2010 | Snodgrass et al. | ......... | 705/14.16 |
| 2010/0287368 A1 * | 11/2010 | Shuster et al. | ................ | 713/150 |

OTHER PUBLICATIONS

WO 2004/038595 Lazarus et al, "Chat Room Method and Program permitting users to communicate with each other while browsing any website", May 6, 2004 pp. 1-14.*
International Search Report and Written Opinion for Application No. PCT/US07/12615 mailed Mar. 21, 2008, 9 pages.

(Continued)

*Primary Examiner* — Karen C Tang
(74) *Attorney, Agent, or Firm* — Banner & Witcoff, Ltd.

(57) ABSTRACT

Users browsing the same website may join in a single communication forum by navigating to a predefined communication web server or website. Navigating to the predefined communication web server includes transmitting an access request to the web server. The access request includes various information including identification information associated with the referring website. Based on the identity of the referring website, the web server joins users into an appropriate communication forum. If a pre-existing communication forum corresponding to the referring website is unavailable, a new communication forum corresponding to the referring website may be created. The communication forum allows users viewing the same referring website to interact and communicate in a variety of ways.

10 Claims, 5 Drawing Sheets

OTHER PUBLICATIONS

Saul Greenberg, et. al., "Collaborative Interfaces for the Web", Human Factors and Web Development, Chapter 18, pp. 241-254, LEA Press, 1997.

Tom Spring, "Newtwork World, Headline: No More Solitary Surfing: CrowdBurst browser add-on lets you chat, co-browse, and post URL-specific notes with fellow Web surfers" Apr. 21, 2000.

Proprietary Technology Allows Active Store Management Through Live Customer Service, Chat, Instant Messaging and Co-Browsing, Dec. 2, 1999, http://www.prnewswire.com/cgi-bin/stories.pl?ACCT=104&STORY=/www/story/12-02-1999/0001087750&EDATE=.

PR Newswire, CrowdBurst Unveils Instant Web Collaboration Service for Consumers and Web Sites, Four Netscape Alums Develop New Service That Allows Web Surfers and Web Sites to Communicate Better-Announce Partnerships With Leading Web Companies, Apr. 20, 2000.

Side Talk Features, http://web.archive.org/web/2000081502729/http://www.sidetalk.com/features/index.html "Surf Together", Aug. 2000.

Judith S. Donath, et al., "The Sociable Web" http://smg.media.mit.edu/people/Judith/SocialWeb/SociableWeb.html, Feb. 2001.

International Search Report and Written Opinion for Application No. PCT/US07/12615 mailed Mar. 21, 2008, 11 pages.

International Preliminary Report on Patentability mailed Dec. 24, 2008, for Application No. PCT/US2007/012615, 9 pages.

* cited by examiner

FACILITATING INTERACTION BETWEEN WEB BROWSERS

FIELD OF THE INVENTION

The invention relates generally to a method and a system for facilitating interactions between web browsing users. Specifically, the invention relates to coordinating communications between users browsing the web based on previously visited sites.

BACKGROUND OF THE INVENTION

Despite the enormity and popularity of the WWW, browsing websites has traditionally been an individual experience. However, in many instances, users may wish to discuss information or news that they find on websites with other users. For example, a user who is viewing a website of an automobile manufacturer may want to communicate with others who are also viewing the same website. Despite this desire, users are often unable to identify other users who wish to interact in such a manner and additionally, to determine which of the interested users have visited or viewed the relevant website or information. Known methods involve installing or using special software or browser modifications which increases the level of complexity for the user.

For the foregoing reasons, a system and method of facilitating communication and interaction between viewers of the same or similar websites is needed.

SUMMARY OF THE INVENTION

Many of the aforementioned problems are solved by providing a method and system that allows viewers of the same website to communicate with one another by navigating to a communication site and/or server. For example, a first user and a second user may be concurrently viewing a first website. Both the first user and the second user may wish to discuss the contents of the first website with other viewers. To do so, the first and the second users may request access to a second site or server that provides and facilitates access to communication fora between viewers of the same or similar websites. The second site extracts information relating to the referring first website from an HTTP packet header associated with each of the access requests. The second website may then determine whether any current communication fora exist corresponding to the first website. If so, both the first user and the second user may be directed to the current communication forum relating to the first website. If, however, such a communication forum does not exist, a new communication forum may be formed and the first and second users joined to that newly created forum. Communication fora may include message/bulletin boards, audio/video conferences, live chats and the like.

In another aspect, a user may be directed to a communication forum based on the referring website as well as additional information relating to the browser, the device, a system operating on the device and/or the user. The additional information may include a browser type, device capabilities, operating system capabilities and user profile data. For example, a web server may generate multiple communication fora for a given referring website. These multiple communication fora may be directed to different audiences based on the additional information. Thus, users navigating to the communication website from a video game website may be directed to different communication fora based on, for example, the age of the user. Similarly, users requesting access to the communication website from an auction site may be separated into different communication fora dealing with the same auction site based on whether the user is a buyer or a seller.

According to yet another aspect, the communication website may provide alternative options to the user if the user decides he or she does not wish to join a communication forum. For example, if a user does not choose to join a communication forum, his or her browser may be directed to a webpage with alternative options such as a list of users currently viewing the same referring website or a list of communication fora that are currently active.

These as well as other advantages and aspects of the invention are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
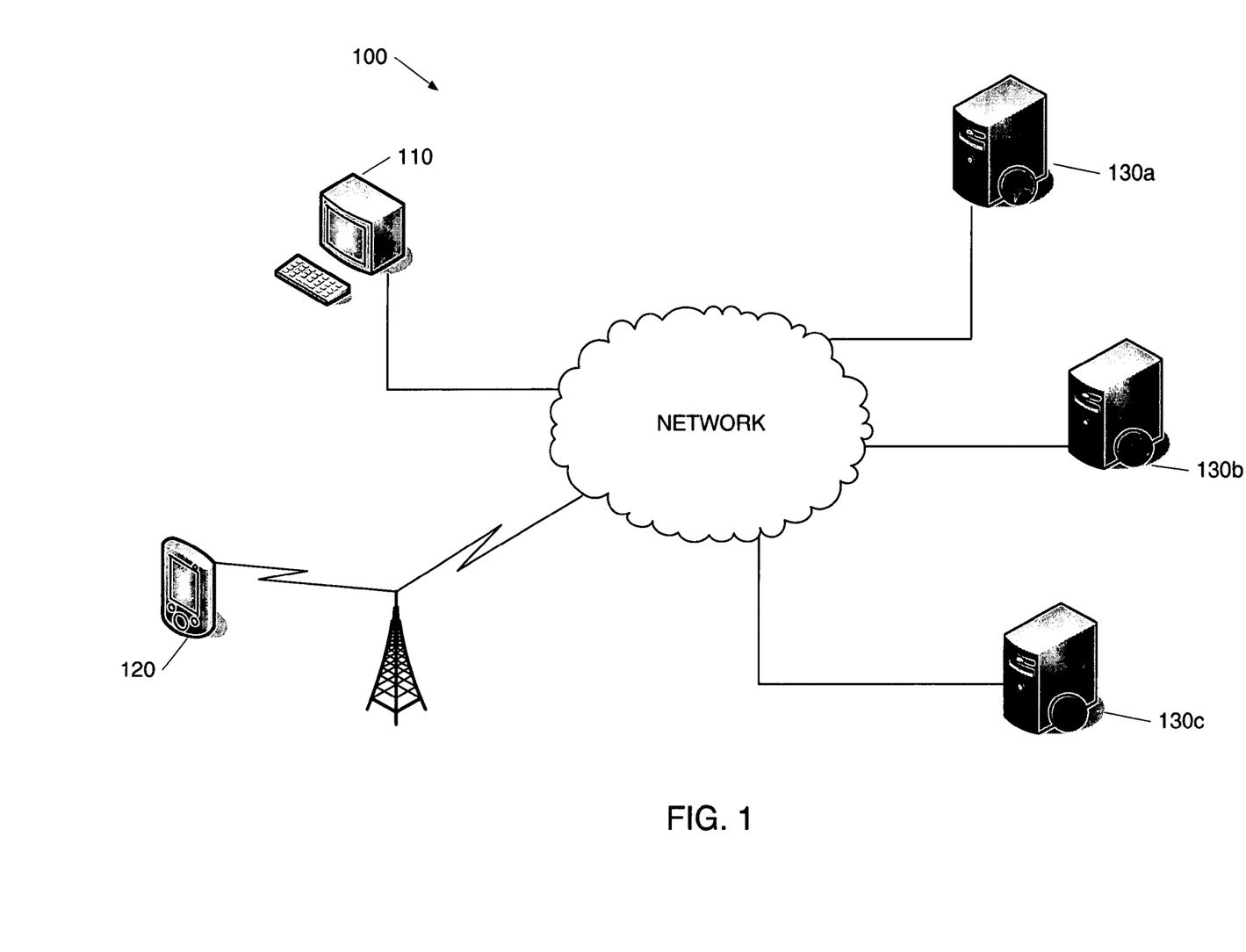
FIG. 1 illustrates a block diagram of a data network in which various embodiments may be implemented.

Aspects of the present invention may be utilized across a broad array of networks and networking protocols. FIG. 1 illustrates an example of a data network 100 in which systems and methods according to at least some embodiments may be employed. Network 100 may be accessed through a variety of means including a personal computer (PC) 110, a personal data assistant (PDA) 120, a cellular telephone (not shown) and the like. Each device 110 and 120 may access the network using any one of a multitude of networking architectures such as a local area network (LAN) and/or a wide area network (WAN). LANs or WANs may be built or implemented using various technologies including both wired and wireless systems such as cellular communications networks, fiber-optic networks and cable networks. Network 100 may further include a range of networking components including servers 130a, 130b and 130c, routers (not shown), hubs (not shown) and switches (not shown). Generally, a user may use PC 110 or PDA 120 to access network 100 in order to obtain content or other data from one or more of servers 130*a*, 130*b* and 130*c*. In one example, server 130*a* may host a variety of websites that provide information related to archaeology. Thus, a student using PC 110 may access network 100 using a communication protocol such as Hypertext Transfer Protocol (HTTP) to view a website hosted on server 130*a* for writing a thesis or term paper. In another example, server 130*b* may provide a search engine for users to locate websites and other forms of data relating to a specific topic or keyword. A user of PDA 120 may request access to and use the search engine hosted by server 130*a* to identify sources, e.g., websites, of interest.

At any given time, multiple users may be accessing network 100 and/or the same server 130*a*, 130*b* or 130*c* at the same time. Referring to the previous example, a user of PDA 120 may be accessing the search engine of server 130*b* at the same time as the user of PC 110. Each user may or may not be aware of the other's presence or access. In one or more aspects, one or more of servers 130*a*, 130*b* and/or 130*c* may track identification information of each of the devices and/or users accessing information from the server 130*a*, 130*b* or 130*c*. Server 130*a*, 130*b* or 130*c* may also store the device and/or user identification information in a database and convey the information to other users viewing sites hosted by the server. For example, server 130*c* may store IP addresses associated with devices 110 and 120 upon receiving each device's respective request for information from server 130*c*. Server 130*c* may then update one or more of the server's sites to reflect the identities of the current browsers. Users browsing those sites may then identify other users and/or devices accessing server 130*c* and/or a site thereof. Identification information may be determined in a variety of ways. For example, device identifications, e.g., IP addresses, may be automatically detected by server 130*c* based on an HTTP header transmitted with an access request. Alternatively or additionally, users may be required to register and log in prior to accessing information on server 130*c*.

Figure 2:
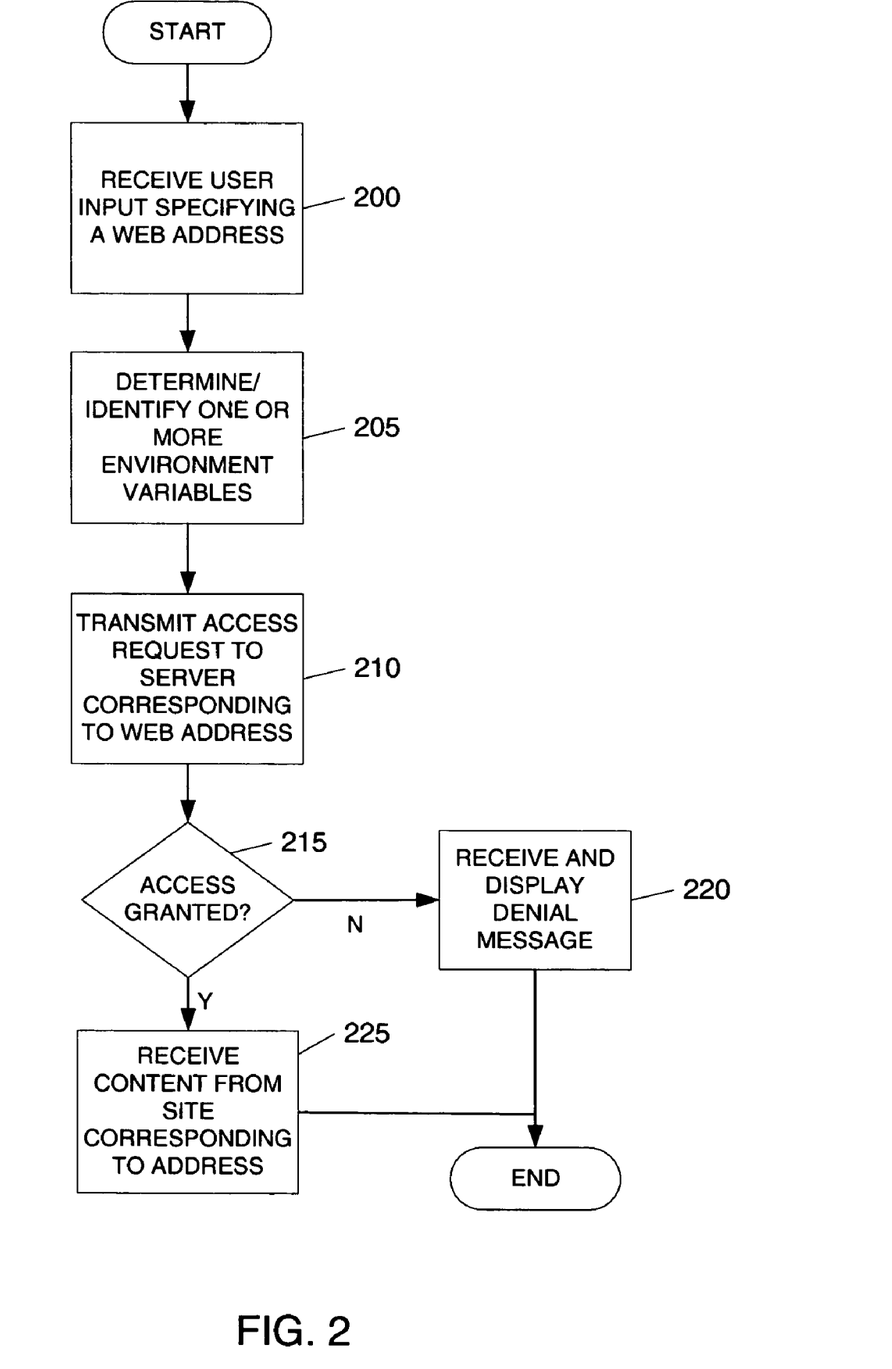
FIG. 2 is a flowchart illustrating a method for accessing a website using a web browser according to one or more aspects described herein.

FIG. 2 is a flowchart illustrating a method for accessing a website hosted on a server using a web browsing application or program. In step 200, a user using a device such as PC 110 (FIG. 1) may enter an address into a web browser application. The web browsing application may be one of a variety of browser applications including MOZILLA FIREFOX, INTERNET EXPLORER and NETSCAPE BROWSER. Web browser applications generally include an address bar where a user may enter a specific destination web address. Upon entering the destination address, the browser application may then extract and determine one or more environment variables in step 205. The environment variables may include information such as the previous website viewed in the browser, a browser type, user profile data (e.g., name, location, age, etc.), operating system capabilities and the like. The environment variables may be extracted from the registry information stored in the operating system, user information entered by the user and/or from information stored by the browser application. For example, the browser application may determine whether the underlying system is able to process a particular type of application based on whether the registry contains keys corresponding to the application type. One of ordinary skill will appreciate that a variety of environment variables may be determined from a multitude of sources.

A request for access is subsequently sent to the destination site in step 210. The request may include a header, e.g., HTTP_HEADER, that provides the environment variables gathered in step 205 to the destination site. One such variable is the HTTP_REFERER variable that is defined based on the referring website. That is, the browser application sets the HTTP_REFERER variable as the address of the website viewed in the browser application immediately prior to the destination site. For example, if a user is viewing a first website with the address www.thiswebsite.com and proceeds to navigate to a second website directly from the first website, the HTTP_REFERER variable may be defined as www.thiswebsite.com. Thus, the destination website may be made aware of the website from which the user navigated to the destination website or web server. A determination is then made at step 215 to see if access was granted by the destination website and/or the server on which the website is hosted. The server may deny access for a variety of reasons such as domain restrictions, browser or system capabilities/compatibility and/or physical location limitations. In the event the server denies access, a denial message may be displayed in the browser application in step 220. For example, a denial message may include an HTTP Error 403 message if access is requested from a forbidden domain. If, however, the server grants the access request, the requested information may be received and displayed in the browser in step 225.

Thus, based on the environment variables that are transmitted to a destination website, a variety of interactions may be facilitated by the destination website. In one or more aspects, a website and/or server may be created to allow users to interact based on the referring website. That is, the website or web server groups users into communication fora or other interactive environments based on the value associated with the HTTP_REFERER variable. Such a system and method allows a user to join a forum from any referring website, not just those websites or servers individually providing such functionality.

Figure 3:
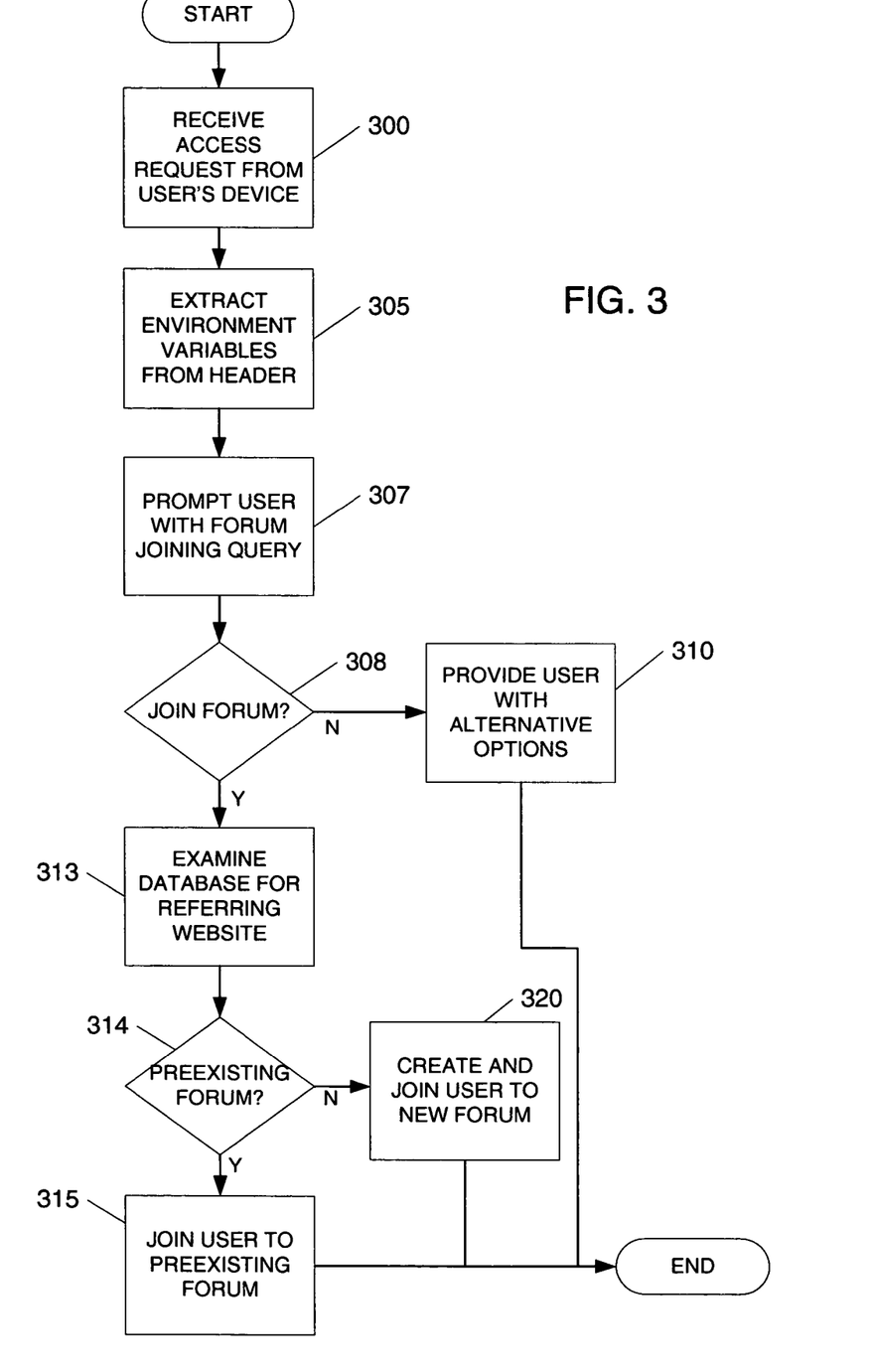
FIG. 3 is a flowchart illustrating a method for identifying and joining users from the same or similar websites in a single communication forum according to one or more aspects described herein.

FIG. 3 is a flowchart illustrating a method for identifying and joining users from the same or similar websites in a single communication forum. In step 300, the web server receives an access request from a device being used by a user to browse one or more websites. Generally, browser applications have the ability to instantiate and maintain multiple browser windows concurrently to allow the user to view multiple websites at the same time. The access request may contain a plurality of environment variables in a header field including an HTTP_REFERER variable. In step 305, the HTTP_REFERER variable and associated value are extracted from the header. To extract the variables and the values corresponding thereto, the web server may parse the header based on known variables or by identifying predefined separators that delineate each variable or field in the header.

Upon identifying the referring website using the HTTP_REFERER variable, the web server may initially prompt the user to determine whether the user wishes to join a communication forum with other users in steps 307 and 308. If the user does not wish to join a communication forum, the user may be presented with a variety of alternative options in step 310. For example, the user may be provided with options to view a list of other users visiting the same referring website or a list of communication fora currently active on the web server. If, on the other hand, the user chooses to join a communication forum, the web server may examine a database of currently existing communication fora in step 313 to determine whether a communication forum corresponding to the referring website currently exists in step 314. If a current communication forum corresponding to the referring website exists, then the device and user may be joined to the identified forum in step 315. A communication forum relates to any environment that allows devices and users thereof to share information on a referring site. Communication fora may include live chat sessions, message/bulletin boards, video/ audio dialogs and the like. Communication fora may further be implemented through a pop-up window, an application/applet window, a new browser and/or the current browser window used by the requesting device. Each communication forum may be hosted by the web server itself or a server that is managed by the web server.

However, if no current communication forum exists that corresponds to the referring website, a new communication forum may be created for the referring website in step 320. In creating the communication forum, the user may be queried to determine a preferred type of forum. For example, a user may want to conduct a live audio chat with other users rather than using a message/bulletin board. Other aspects of the communication forum may also be dictated by user input. Alternatively or additionally, the communication forum may be automatically generated based on a template. A template may be predefined based on various factors including a topic or subject associated with the referring website. Communication fora may be created through various implementations including the use of Active Server Pages (ASP) and/or plug-in communication software.

Figure 4:
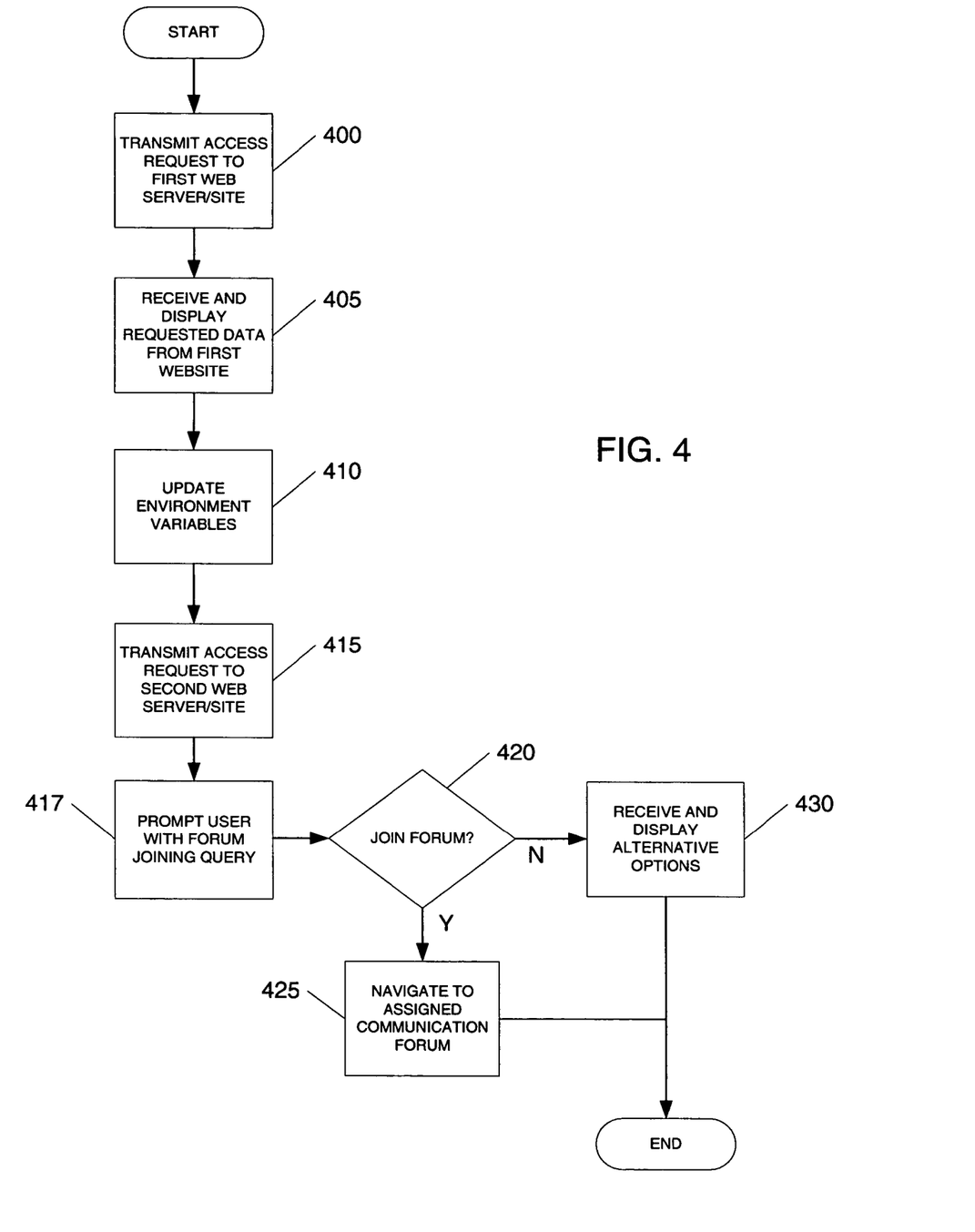
FIG. 4 is a flowchart illustrating a method for joining and/or initiating a communication forum associated with a referring website according to one or more aspects described herein.

FIG. 4 is a flowchart illustrating a method for joining or initiating interaction with other viewers of the same website using a web browser. The method of FIG. 4 is illustrated from the perspective of the browsing user. In step 400, for example, a user transmits a request to access a first website. The user may directly enter a known web address or click on a link that directs the user and the browser application to the destination site or server. The browser application receives and displays the requested data from the first website in step 405 once access has been granted by the server hosting the first website. The data may include images, text, audio, video and the like. After receiving the data from the first website, the browser application may update various environment variables including the HTTP_REFERER variable in step 410. For example, the browser application may set the value of the HTTP_REFERER variable to the address of the first website. Alternatively or additionally, the value of the HTTP_REFERER variable may be defined or modified only upon navigating away from the first website. That is, the HTTP_REFERER variable may only be updated when the user decides to navigate to another site or server from the first website.

In step 415, the user transmits a request to access a second website and/or server that facilitates communication and interaction between viewers of the same first website. The user may navigate to the second website and/or server using a multitude of processes including selecting a text or image link from the first website, an option in the browser application toolbar and/or directly inputting the second website address into an address bar of the browser application. Additionally, the transmitted request may include an HTTP_REFERER variable identifying the first website as the referring website. Prior to joining a communication forum, the user may be prompted in step 417 to determine whether the user wants to join a communication forum with other users in step 420. Based on an affirmative response from the user and the identity of the referring website, the user's browser application may be directed to an appropriate communication forum in step 425. For example, the second website or server may refer the user's browser application to a server or site address that is hosting the appropriate communication forum. According to one or more aspects, a new instantiation of the browser application may be created so that the user may interact in the communication forum while still having access to the first website. Alternatively or additionally, a plug-in program may be downloaded to the user's system for executing a communication application such as a live chat applet or a video/audio conference tool. The applet and/or tool may be instantiated as a separate window or as a component of the second website. If, however, the user chooses not to join a communication forum in step 420, the user may be provided with alternative options in step 430 such as an option to view other users viewing the same first website or an option to view a list of current communication fora.

In one or more embodiments, steps 417 and 420 may be bypassed. That is, instead of prompting the user to determine whether the user wants to enter a chat forum, a communication web server may automatically place a user into an appropriate forum without the initial prompt. The prompt may also be toggled on and off based on user preferences by selecting one or more options provided by the communication web server. For example, a user may be initially prompted with a dialog box asking whether the user wants to enter a communication forum. The dialog box may further include a toggle option asking whether the user wants to be prompted in the future. A variety of other toggles and methods may be implemented for determining whether the user wants to be prompted prior to joining a communication forum.

Figure 5A:
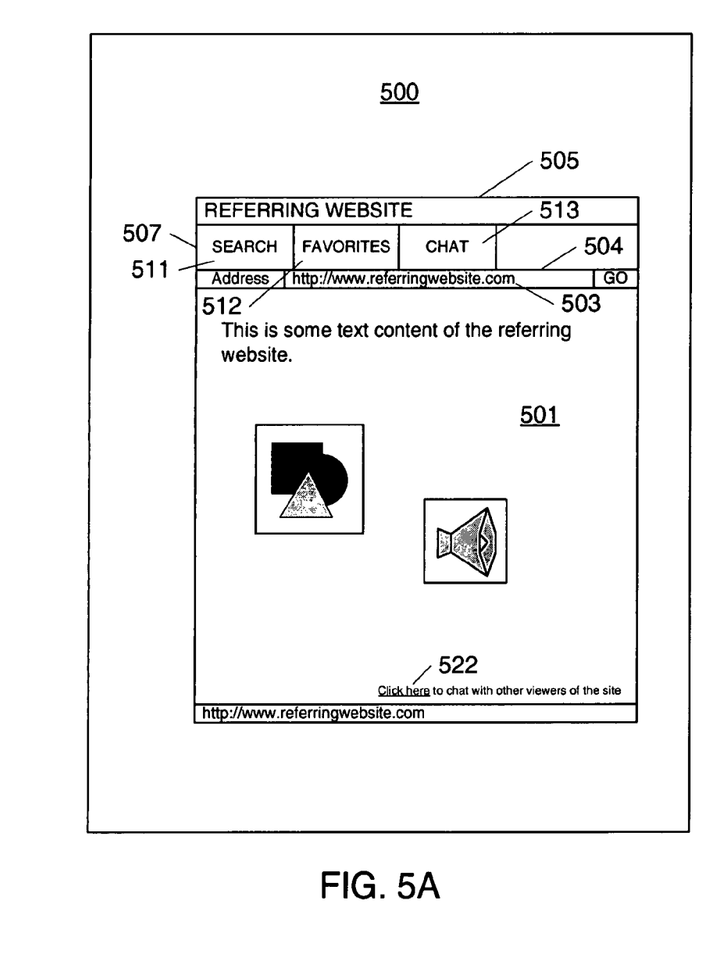
FIGS. 5A and 5B illustrate a user interface before and after a user is joined to a communication forum based on a referring website according to one or more aspects described herein.
Figure 5B:
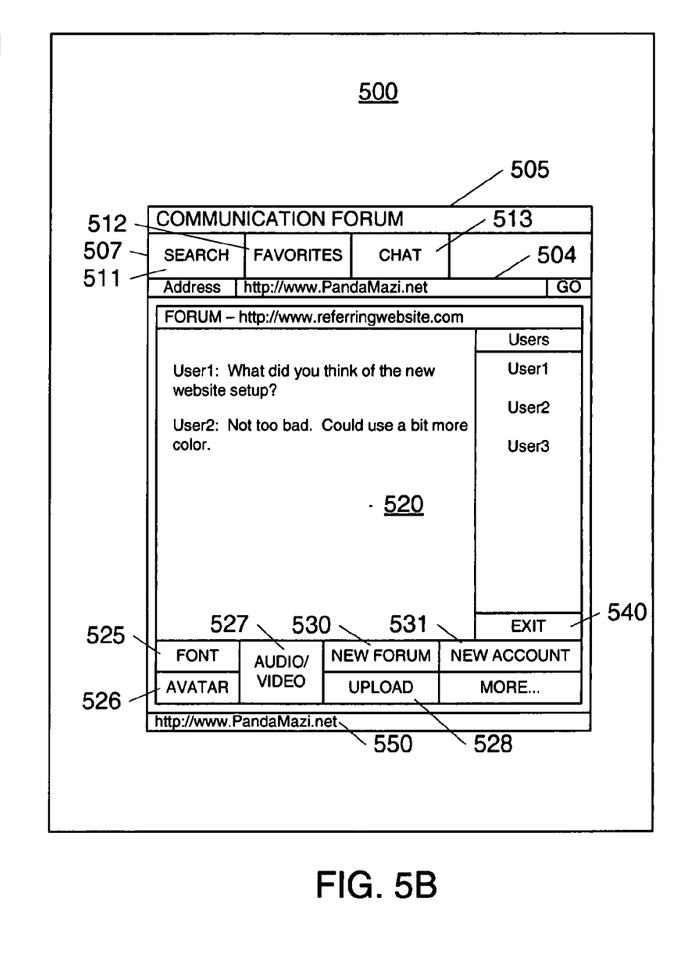

FIGS. 5A-5B illustrate user interface 500 and browser 505 before and after a user is joined to communication forum 520 based on referring website 501. FIG. 5A illustrates a before user interface displaying browser 505 which, in turn, displays content associated with referring website 501 corresponding to address 503 in address bar 504. A user may use address bar 504 to identify, input and/or navigate to known web addresses. Browser 505 further includes toolbar 507 having a variety of options such as a search button 511, a favorites button 512 and a chat forum button 513. Upon selecting chat forum button 513, the user is directed to a predefined web address 550 (FIG. 5B) corresponding to the communication web server. FIG. 5B illustrates user interface 500 and browser 505 after the user has selected the chat forum button 513. In particular, browser 505 in FIG. 5B displays communication forum 520 to which the user has been joined based on the referring website 501. Alternatively or additionally, referring website 501 may include a link 522 to the communication web server. Thus, a user may use either a toolbar option 513 or a link 522 embedded in the referring website 501 to access communication forum 520. The user may also directly input the address of the communication web server, e.g., address 550, into address bar 504 to join forum 520. Various other methods of navigating to the communication server and forum 520 from referring website 501 may also be used. Communication forum 520 includes a variety of interactive options that allow the user to manipulate and control his or her communications with other users. The interactive options include font style options 525, avatar selection tool 526, audio/video connection initiation function 527, image and file upload function 528, new forum creation tool 530 and user account creation option 531. Other information may also be provided to the user in the forum interface 520 including ads, a list of the top ten fora and product reviews. Alternatively or additionally, one or more portions of the communication forum may be implemented as a pop-up window or an external applet.

The forum interface 520 also includes an exit option 540 that allows the user to manually logoff of the communication forum and server. Alternatively or additionally, the user may be logged out or disconnected from the communication server after a predefined amount of time. For example, a communication web server may have a predefined 15 minute time allowance for each user. At the expiration of the 15 minutes, the server may prompt the user to determine whether the user wants additional time. If no response or a negative response is received, the communication server may automatically disconnect and/or logout the user. Other methods of automatically logging out a user may be implemented including detecting a TCP disconnect signal notifying the server that the user has closed his or her corresponding browser. Alternatively or additionally, the web server may keep track of a user's idle time (e.g., period of non-interaction). If the idle time reaches a predefined threshold, the user may be automatically signed off of the server.

In one or more aspects, the communication forum server may host multiple communication fora for a single referring website. Each of the multiple communication fora directed to the same referring website may be generated for different audiences. For example, users of all age groups may navigate to the communication forum server from a movie database website. Since some movie discussions may be inappropriate for younger age groups, several fora may be created for the movie database website for different age groups. Thus, when an access request is received from a user through his or her device, the forum server may initially extract the HTTP_REFERER variable and subsequently identify one or more additional characteristics such as a user's age and/or location in order to join the user to a proper forum associated with the referring website.

The methods and features recited herein may further be implemented through any number of computer readable mediums that are able to store computer readable instructions. Examples of computer readable mediums that may be used include RAM, ROM, EEPROM, flash memory or other memory technology, CD-ROM, DVD or other optical disk storage, magnetic cassettes, magnetic tape, magnetic storage and the like.

The present invention has been described in terms of preferred and exemplary embodiments thereof. Numerous other embodiments, modifications and variations within the scope and spirit of the appended claims will occur to persons of ordinary skill in the art from a review of this disclosure.

I claim:

1. A method for facilitating interaction between users, the method comprising:
   receiving, at a server, a first access request from a first user through a first device, wherein the first access request includes:
      a specification of a destination website provided by the server;
      a HTTP header; and
      identification information associated with a first referring website previously viewed by the first user and from which the first user is navigating to the destination website;
   extracting, by the server, the identification information associated with the first referring website from the first access request, wherein the identification information associated with the first referring website is extracted from an HTTP_REFERER variable in the HTTP header;
   determining, by the server, that a first communication forum specific to the first referring website exists using the extracted identification information;
   selecting the first communication forum from a plurality of communication fora specific to the first referring web site based on an age of the first user; and
   in response to determining that the first communication forum specific to the first referring website exists, the server joining the first user to the first communication forum by redirecting the first user to a chat server hosting the first communication forum, wherein joining the first user to the first communication forum includes:
      prompting the first user to determine whether the first user wishes to join the first communication forum;
      determining that the first user does not wish to join the first communication forum; and
      in response to determining that the first user does not wish to join the first communication forum, providing the first user with an option to view a list of one or more other users participating in the first communication forum.

2. The method of claim 1, wherein the step of determining whether a first communication forum specific to the first referring website exists includes comparing the extracted identification information with a database of referring websites.

3. The method of claim 2, wherein the database stores an association between the first referring website and the first communication forum.

4. The method of claim 1, wherein determining whether a first communication forum specific to the first referring website exists further includes determining whether one or more additional attributes of the first communication forum matches one or more additional variables in the access request.

5. The method of claim 1, wherein only users navigating from the first referring web site are joined to the first communication forum.

6. An apparatus comprising:
   at least one processor; and
   memory operatively coupled to the at least one processor and storing computer readable instructions that, when executed, cause the apparatus to:
      receive an access request from a first user, wherein the access request includes:
         a specification of a destination website provided by the apparatus;
         a HTTP header; and
         identification information associated with a referring website previously viewed by the first user;
      extract the identification information from the access request, wherein the identification information associated with the referring website is extracted from an HTTP_REFERER variable in the HTTP header;
      determine, by the apparatus, whether a communication forum specific to the referring website exists;
      select the first communication forum from a plurality of communication fora specific to the referring website based on an age of the first user; and
      in response to determining that a communication forum specific to the referring website exists, join the first user to the communication forum by redirecting the first user to a chat server hosting the communication forum, wherein joining the first user to the communication forum includes:
         prompting the first user to determine whether the first user wishes to join the communication forum;
         determining that the first user does not wish to join the communication forum; and
         in response to determining that the first user does not wish to join the communication forum, providing the first user with an option to view a list of one or more other users participating in the communication forum.

7. The apparatus of claim 6, wherein determining whether a communication forum specific to the referring website exists includes comparing the extracted identification information with a database of referring websites.

8. One or more non-transitory computer readable media storing computer readable instructions that, when executed, cause an apparatus to:
   receive, at a server, an access request from a first user, wherein the access request includes:
      a specification of a destination website provided by the server;
      a HTTP header; and
      identification information associated with a referring website previously viewed by the first user and from which the first user is navigating to the destination website;
   extract the identification information from the access request, wherein the identification information associated with the referring website is extracted from an HTTP_REFERER variable in the HTTP header;
   determine whether a communication forum specific to the referring website exists;
   select the communication forum from a plurality of communication fora specific to the referring website based on an age of the first user; and
   in response to determining that a communication forum specific to the referring website exists, join the first user to the communication forum by redirecting the first user to a chat server hosting the communication forum, wherein joining the first user to the communication forum includes:
      prompting the first user to determine whether the first user wishes to join the communication forum;
      determining that the first user does not wish to join the communication forum; and
      in response to determining that the first user does not wish to join the communication forum, providing the first user with an option to view a list of one or more other users participating in the communication forum.

9. The one or more non-transitory computer readable media of claim 8, wherein determining whether a communication forum specific to the referring web site exists includes comparing the extracted identification information with a database of referring websites.

10. The method of claim 1, further comprising:
   receiving, by the server, a second access request from a second user through a second device, wherein the second access request includes:
      the specification of the destination website provided by the server; and
      identification information associated with a second referring website previously viewed by the second user and from which the second user is navigating to the destination website; and
   the server automatically joining the second user to a second communication forum specific to the second referring website.

\* \* \* \* \*